(12) United States Patent
D'Ancona

(10) Patent No.: US 8,984,995 B2
(45) Date of Patent: Mar. 24, 2015

(54) DEVICE FOR THE FAST EXCHANGE OF NUTS IN A LATHE PLATE

(71) Applicant: Systec Metalurgica Ltda.

(72) Inventor: Ricardo Levi D'Ancona, Vinhedo (BR)

(73) Assignee: Systec Metalurgica Ltda, Vinhedo-Sp (BR)

(*) Notice: Subject to any disclaimer, the term of this patent is extended or adjusted under 35 U.S.C. 154(b) by 289 days.

(21) Appl. No.: 13/728,372

(22) Filed: Dec. 27, 2012

(65) Prior Publication Data

US 2013/0333533 A1  Dec. 19, 2013

(30) Foreign Application Priority Data

Jun. 18, 2012 (BR) .......................... 10 2012 014814

(51) Int. Cl.
  *B23B 3/14* (2006.01)
  *B23B 31/16* (2006.01)
  *B23B 31/10* (2006.01)

(52) U.S. Cl.
  CPC ............. *B23B 3/14* (2013.01); *B23B 31/16279* (2013.01)

USPC .............................................. 82/166; 82/165

(58) Field of Classification Search
  USPC ............ 82/166, 165, 167, 162, 155, 142, 117
  See application file for complete search history.

(56) References Cited

U.S. PATENT DOCUMENTS

| | | | | |
|---|---|---|---|---|
| 2,950,117 | A * | 8/1960 | Walmsley | 279/123 |
| 3,104,474 | A * | 9/1963 | Rehart | 33/563 |
| 3,179,430 | A * | 4/1965 | Zierden | 279/123 |
| 3,322,434 | A * | 5/1967 | Barnes et al. | 279/123 |
| 3,606,808 | A * | 9/1971 | Bowden | 82/165 |
| 3,833,232 | A * | 9/1974 | Behrens | 279/123 |
| 4,431,202 | A * | 2/1984 | Swenson | 279/106 |

* cited by examiner

*Primary Examiner* — Will Fridie, Jr.
(74) *Attorney, Agent, or Firm* — B. Aaron Schulman, Esq.; Stites & Harbison, PLLC

(57) ABSTRACT

A mechanical device for the fast exchange of jaws in a lathe plate providing an intermediate jaw support attached to the jaw holder with a straight support face and providing with a guide wherein the jaw is positioned and fixed precisely and eliminating the clearances found in the conventional method.

12 Claims, 15 Drawing Sheets

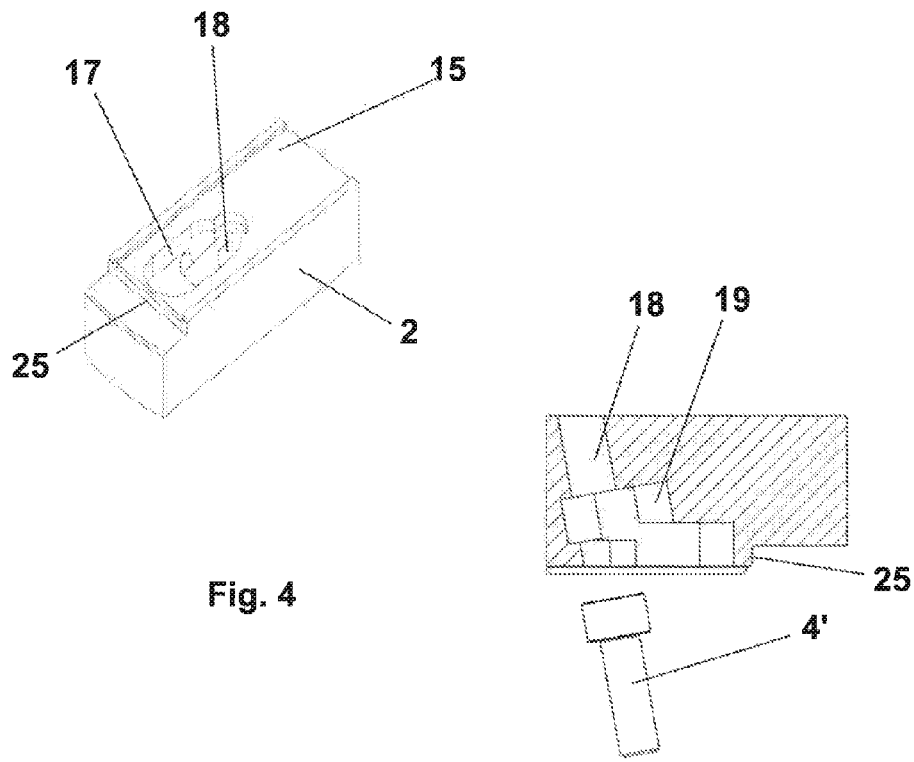
Fig. 4
Fig. 5
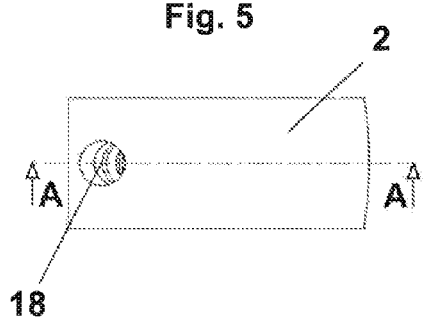
Fig. 6

US 8,984,995 B2

DEVICE FOR THE FAST EXCHANGE OF NUTS IN A LATHE PLATE

FIELD OF THE INVENTION

The present invention is directed to a device for the fast exchange of jaws in a lathe plate pertaining to the mechanical field.

BACKGROUND OF THE INVENTION

The process for exchanging jaws in a lathe plate through traditional positioning methods (knurled or keyed) is known in the state of the art, however, the existence of a clearance between the parts makes it difficult to repeat the positioning of jaws with a precise concentricity and axial relationship between the machine-tool camshaft and the part that is held by the jaws.

In spite of the fact that such methods are used successfully in parts that do not require a fast jaw exchange time and high precision positioning, they are unsatisfactory when the existence of technological ground involved in huge lots of serial parts is required.

Thus it has been necessary a device that makes it possible to exchange jaws quickly in a lathe plate with a precise positioning and substantial reduction in the downtime of the machine-tool not attained in the present exchange process, thus providing greater efficiency and practicality.

BRIEF DESCRIPTION OF THE DRAWINGS

FIG. 4 is a perspective view of the jaw, specifically showing the lower, back and right faces.

FIG. 5 is a cut view along the A-A line of the jaw shown in FIG. 6.

FIG. 6 is a top view of the jaw.

SUMMARY OF THE INVENTION

Figure 1:
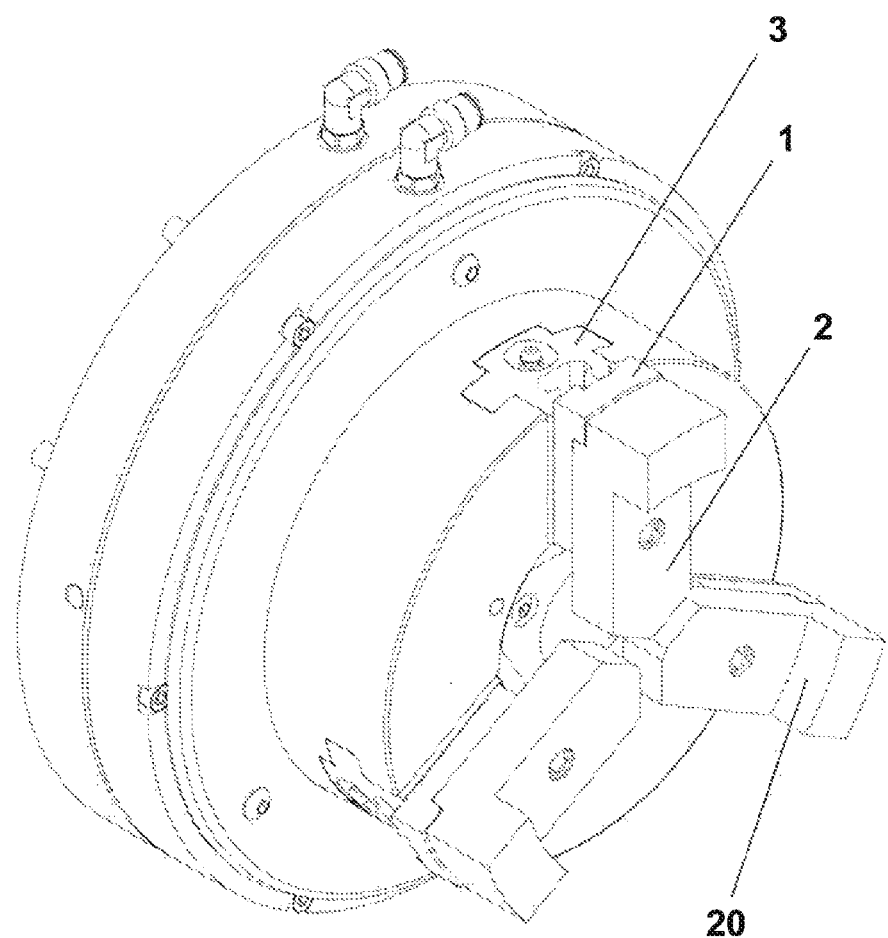
FIG. 1 is a perspective view of the device for the fast exchange of jaws in a plate of lathe assembled on a lathe plate.
Figure 2:
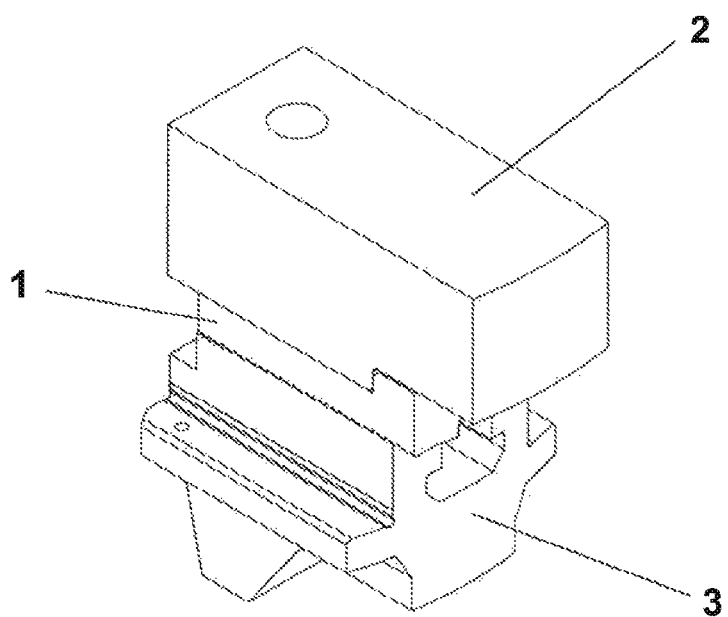
FIG. 2 is a perspective view of the device for the fast exchange of jaws.
Figure 3:
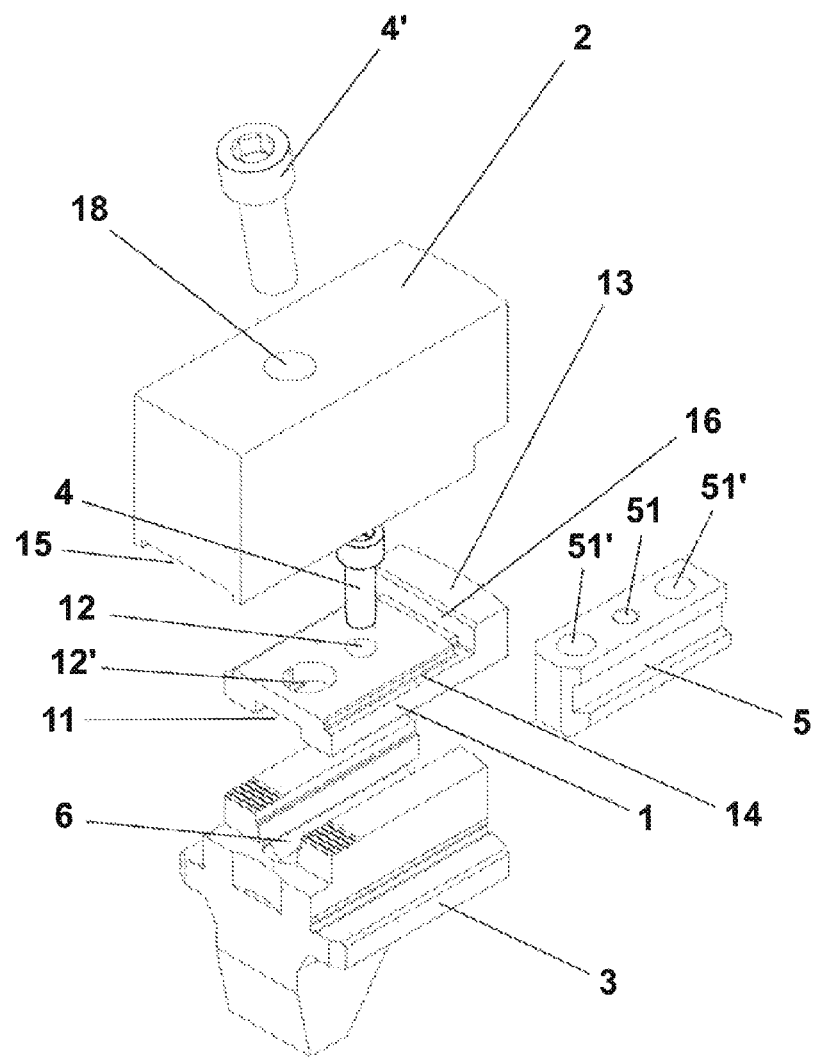
FIG. 3 is an exploded perspective view of the device for the fast exchange of jaws.
Figure 7:
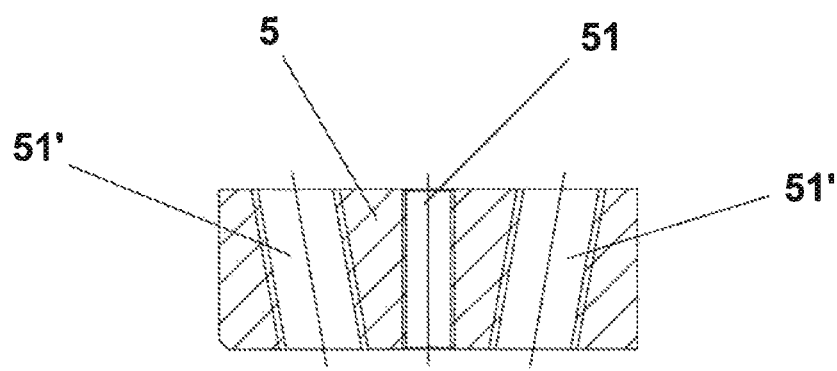
FIG. 7 is a cut view along line B-B of the "T" retainer shown in FIG. 8.
Figure 8:
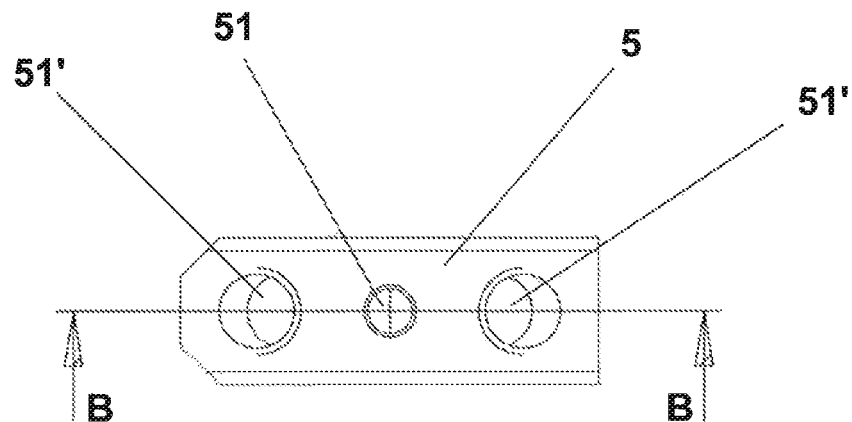
FIG. 8 is a top view of the "T" retainer.

The present application seeks to provide a device for the fast exchange of jaws in a lathe plate has been developed that addresses the above-mentioned inconveniences besides providing other advantages derived from the conception thereof, wherein an intermediate jaw support is attached to the jaw holder with a straight support face and provided with a guide wherein the jaw is positioned and fixed precisely and also without the clearances found in the conventional method.

The present application seeks to provide a device for the fast exchange of jaws in a plate of lathe, comprising: (A) a jaw holder (3) having a longitudinal central channel (6) on an upper side; (B) a T retainer (5) having a straight grooved hole (51) and a slanted grooved hole (51'); the retainer constructed and arranged to be slidebly placed in the longitudinal central channel (6); (C) a jaw support (1) having lateral guides (14) on an upper surface; having a protuberance (13) on one end, the protuberance including a internal support face (16); the jaw support having a straight hole (12) axially aligned with the the straight grooved hole (51) of the T retainer (5), and a slanted hole (12') axially aligned with the slanted grooved hole (51') of the T retainer (5); and having a longitudinal central channel (11) in a lower surface; the jaw support constructed and arranged to be slidebly placed on an upper surface of the T retainer (5); (D) a first screw (4) inserted into the straight grooved hole (51) of the T retainer (5) and the straight hole (12) of the jaw support (1) attaching the jaw support (1) and the T retainer (5) to the jaw holder (3); (E) a jaw (2) having a longitudinal central channel (15) on a lower surface the lower surface provided with an oblong center slit (17) internally provided with a slanted through-hole (18), and a radial housing (19) constructed and arranged to house a head of the first screw (4); the jaw constructed and arranged to be slidebly placed on an upper surface of the jaw support (1); the lower surface having an undercut (25) constructed and arranged to fit onto the internal support face (16) of the protuberance (13), and (F) a slanted screw (4') inserted into the slanted through-hole (18) of the jaw (2) and into the slanted hole (12') of the jaw support (1), and into the slanted grooved hole (51') of the T retainer (5), attaching the jaw (2) and the jaw support (1) and the T retainer (5) to the jaw holder (3). The slanted hole (51') of the T retainer (5), the slanted hole (12') of the jaw support (1) and the slanted through-hole (18) of the jaw (2) are slanted in such a way that the slanted screw (4') is inserted at a same inclination and thus allowing to precisely position the undercut (25) of the jaw (2) onto the internal support face (16) of the protuberance (13). When exchanging the jaw, the slanted screw (4') is released and the jaw (2) in replaced.

DETAILED DESCRIPTION OF THE INVENTION

According to FIGS. 1 through 8, first embodiment of the present device comprises an assembly composed of an intermediate jaw support (1) and the jaw (2) itself that are attached to the jaw holder (3) by means of screws (4 and 4') fixed to the [ ] T retainer (5) through grooved holes (51 and 51') respectively, and that in turn have a lower portion attached to the channel (6) of the jaw holder (3) and the fixed upper portion to the channel (11) of said intermediary jaw support (1). Jaw support (1) is also provided in the upper part thereof with a hole (12) and an slanted hole (12'), for the introduction of screws (4; 4') respectively, a protuberance (13) that forms a straight or curved support face (16) (see FIG. 24), and a guide (14) that restrains the radial movement of the jaw (2), through the channel (15) and helps to position same so that it rests ideally on the internal support face (16) formed by the protuberance (13) through the channel (15). Said jaw (2) is also provided in the lower portion thereof with an oblong center slit (17) internally provided with a slanted through-hole (18), and a radial housing (19) wherein the head of the screw (4) is held.

Grooved hole (51') of the [ ] T retainer and hole (18) of the jaw are slanted so that they can receive the screw (4') at the same inclination, thus allowing for a more precise positioning of the undercut (25) of the jaw (2) on the face of the internal support (16) of the protuberance (13), due to distribution of the compressive force that provides a vector force with a vertical and horizontal movement resulting from the inclination that varies from 1 to 89 degrees, preferably between 1 and 20 degrees. On the other hand, the screw (4) is inserted into the grooved hole (51) in the conventional way.

The jaw (2) is also provided in the upper part thereof with a curved undercut (20) that shall mate with the part that will be machined and one or two holes (18).

According to FIGS. 9 through 15, in a second embodiment, when the same jaw is used in parts held through the internal or external diameter, the intermediate support jaw device (1) shall be provided with a centered or off-centered protuberance (30) on the upper part thereof provided with a hole (33) for attachment to the [ ] T retainer (5) through the grooved hole (51), said protuberance (30) forming an internal support face (31), and an external support face (32), both of which are straight, for supporting the internal faces (31' and 32') of the slit (36) of the jaw (2) that shall be attached through the screw (4') fixed to one of the grooved holes (51') of the [ ] T retainer, both inclined towards the center of the intermediate support jaw device (1) and passing through one the holes (34) thereof.

Figure 16:
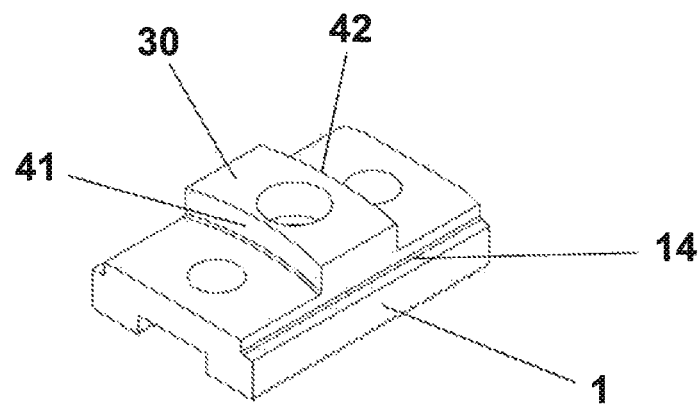
FIG. 16 is a perspective view of a third embodiment of the intermediate jaw support.
Figure 17:
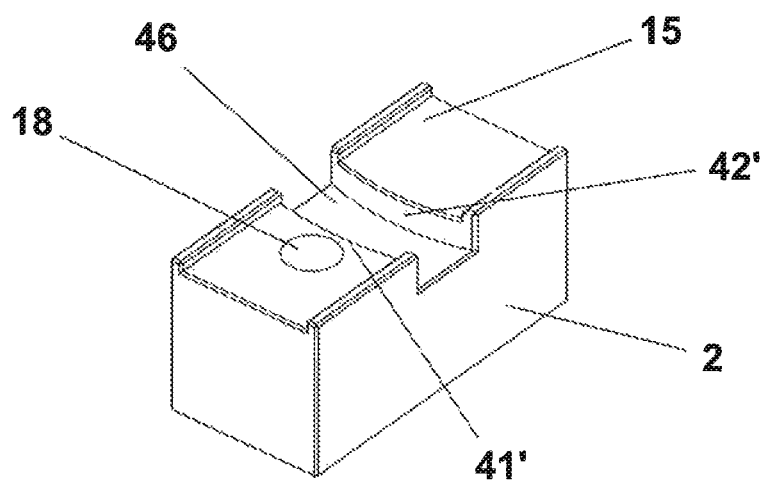
FIG. 17 is a perspective view of the jaw according to the third embodiment.
Figures 18, 19:
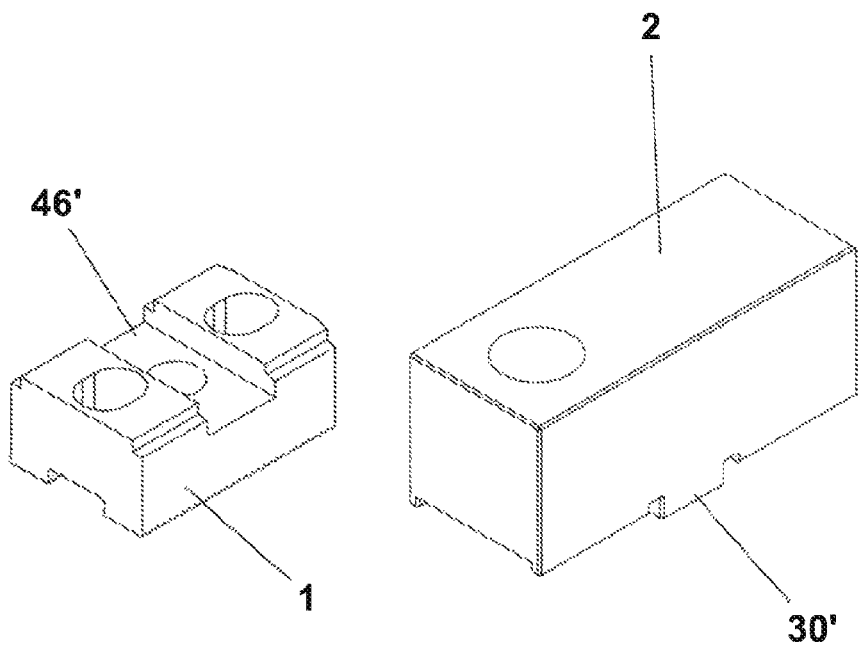
FIG. 18 a is perspective view of a fourth embodiment of the intermediate jaw support.
FIG. 19 is a perspective view of the jaw according to the fourth embodiment.
Figure 20:
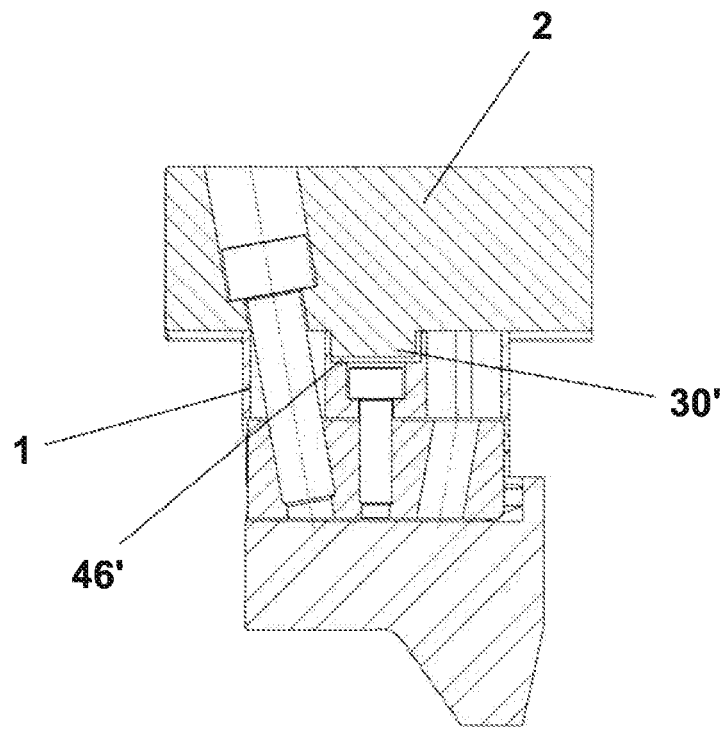
FIG. 20 a is cut view along line F-F of the fourth embodiment of the device shown in FIG. 21.
Figure 21:
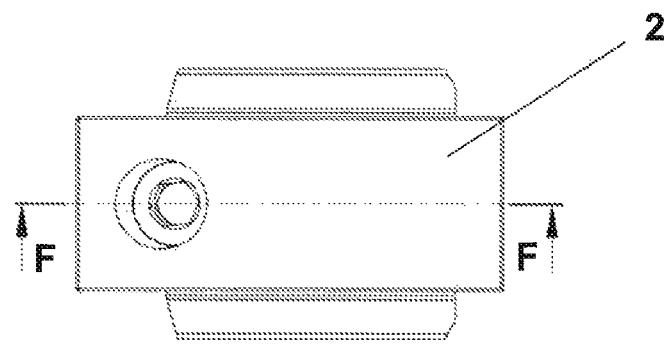
FIG. 21 is a top view of the device for the fast exchange of jaws according to the fourth embodiment.

According to FIGS. 16 and 17, in a third embodiment, the center protuberance (30) might be curved, forming an internal support face (41) and an external support face (42), both of which are curved, for supporting the internal faces (41' and 42') of the slit (46) of the jaw (2) that shall follow the same curvature.

According to FIGS. 18 through 21, in a fourth embodiment, the center protuberance (30) of the support and the slit (46) of the jaw could be reverted, thus forming the protuberance (30') on the jaw (2) and the slit (46') on the intermediate jaw support (1), however, this does not changes anything at all in the functioning of the device.

Figure 22:
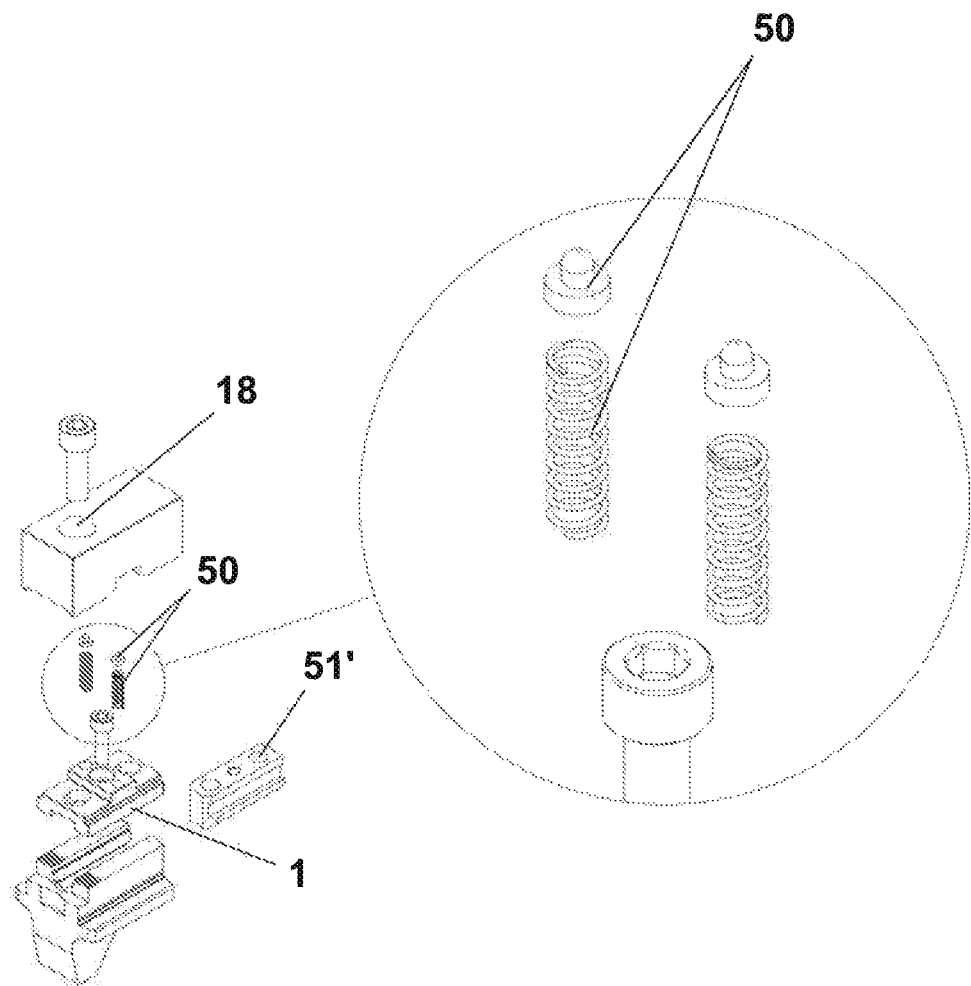
FIG. 22 is an exploded perspective view of a fifth embodiment of the device provided with a detailed spring-loaded screw.
Figure 23:
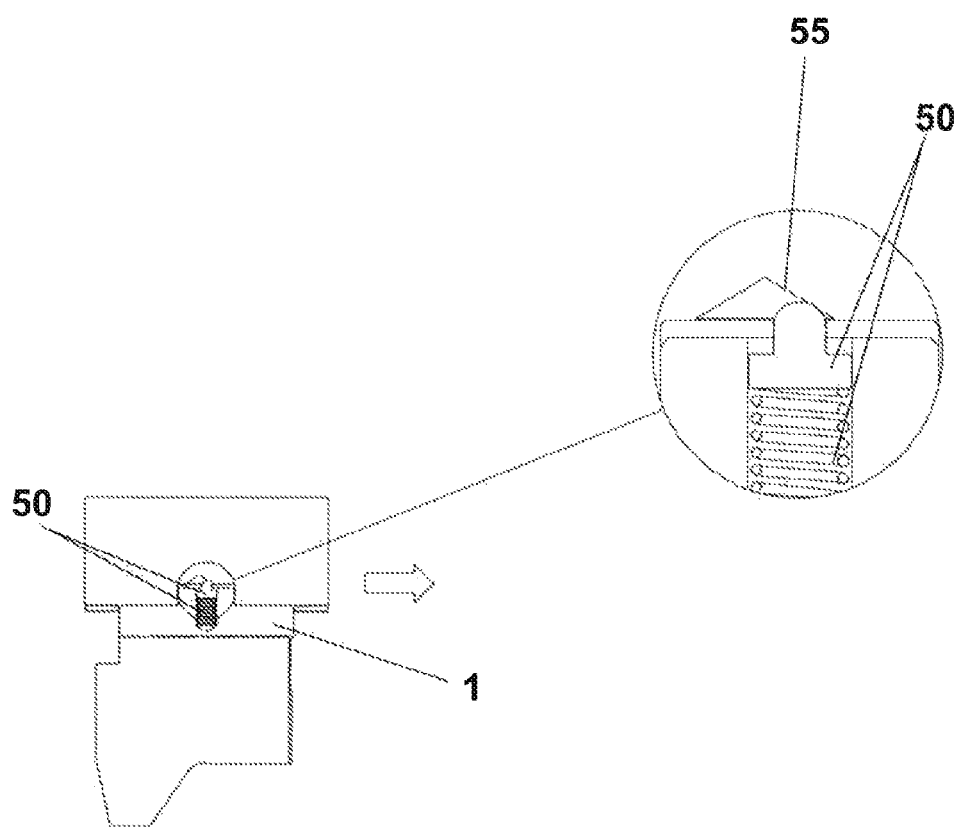
FIG. 23 is a side view of the device provided with a detailed spring-loaded screw pushing the jaw against the jaw support face, according to the fifth embodiment.

According to FIGS. 22 and 23, in a fifth embodiment, the slanted holes (18) of the jaw (51') of the [ ] T retainer shall form a right angle and optionally in this in case the intermediate support (1) shall be provided with a spring-loaded screw (50) that shall push the undercut (55) provided in the jaw against the face of the protuberance of the intermediate support, thus providing a more precise positioning of the jaw, that could be external or internal according to the way it is assembled, as can be seen in details in FIG. 23.

Figure 24:
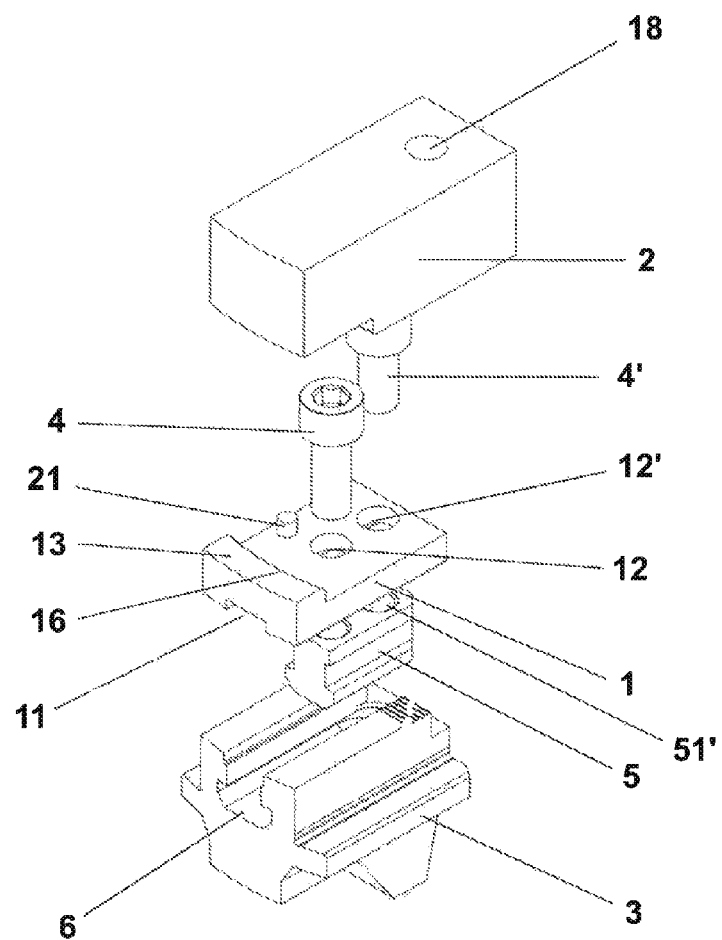
FIG. 24 is an exploded perspective view of a sixth embodiment of the device provided with the straight attachment holes, without the guide and provided with a stopping pin.
Figure 25:
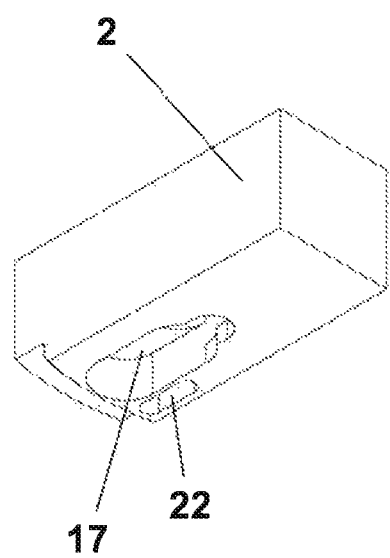
FIG. 25 is a perspective view of the jaw, according to sixth embodiment, specifically showing the lower part.

According to FIGS. 24 and 25, in a six embodiment, instead of the guide (14) and the undercut (15), the flat upper part of the intermediate support jaw device (1) is provided with a pin (21) that restrains the radial movement of the jaw (2), through the slit (22), thus helping to position same so that it rests ideally on the face (16) of the protuberance (13), and thus the hole (18) and the grooved hole (51') shall be straight in such a way that they can receive the screw (4') without any inclination.

Figure 26:
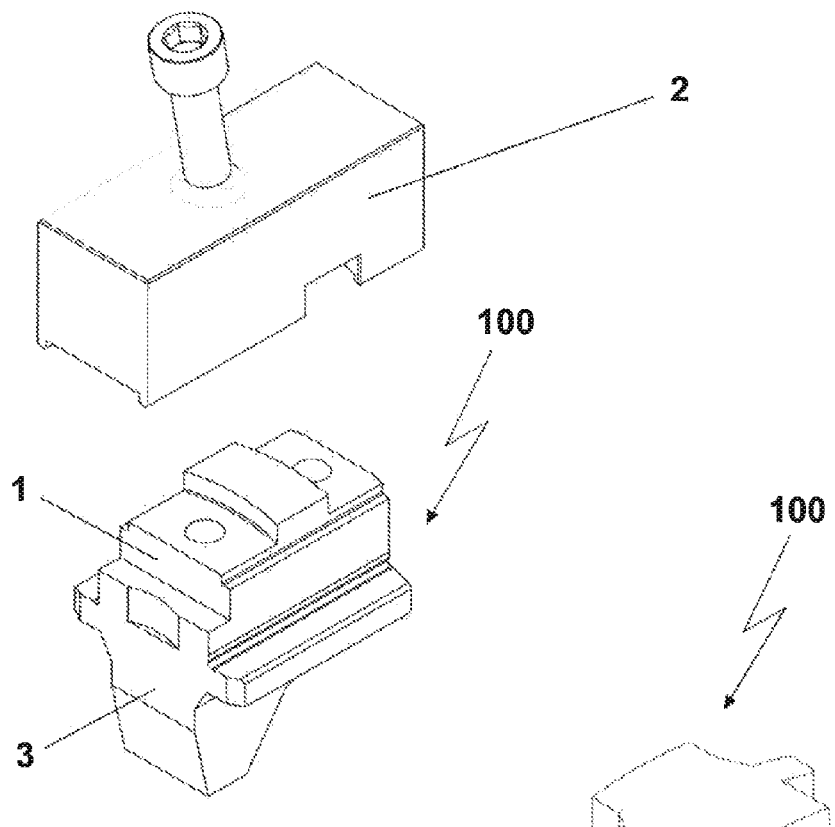
FIG. 26 is an exploded perspective view of a seventh embodiment of the device, with the jaw holder and the jaw support as a single part.
Figure 27:
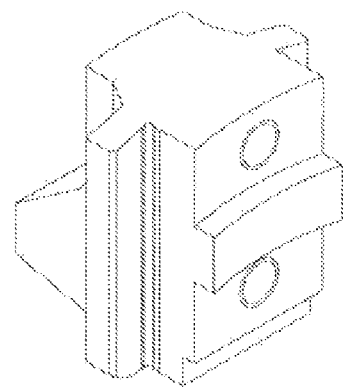
FIG. 27 is a perspective view of a fifth embodiment of the jaw holder and the jaw support as a single part.

According to FIGS. 26 and 27, in a seven embodiment, the jaw holder (3) and the intermediate jaw support (1) shall be machined in order to form a single body (100).

By using the device for the fast exchange of jaws in a lathe plate, the jaws can then be exchanged in a faster and precise way. First of all the intermediate jaw support (1) is attached to the jaw holder (3) by inserting the screw (4) into the grooved hole (51) of the [ ] T retainer (5), and it is precisely calibrated regarding the concentricity and axial relationship with relation to the camshaft of the machine, and thus cannot be released and lose the previously cited precision. Afterwards, the jaw (2) is attached to the intermediate jaw support (1) by also attaching the screw (4') to the [ ] T retainer (5) through the slanted grooved hole (51') that, in view of the movement in two directions, distributes the compressive force on the screw in the horizontal and vertical directions, thus creating a vector force that allows for a perfect positioning of the jaw (2) in the intermediate support (1). Thus, in order to exchange the jaw, it is enough to release the screw (4'), remove the jaw and place another one in the same way, thus providing the desirable precise positioning with a considerable reduction of time due to the perfect fit onto the internal support face (16) of the protuberance (13). The same applies for the respective variations of the device.

Figure 9:
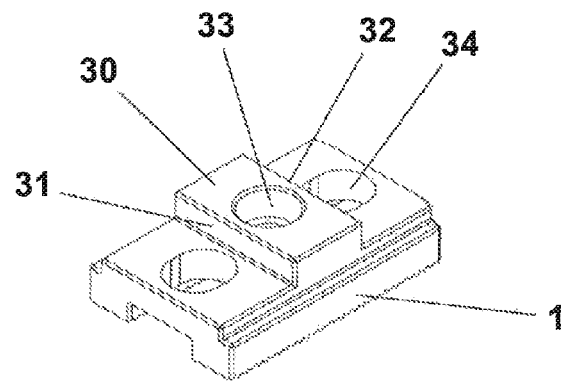
FIG. 9 is a perspective view of a second embodiment of the intermediate jaw support.
Figure 10:
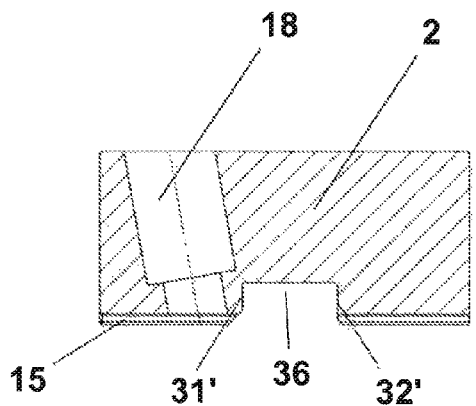
FIG. 10 is a cut view along line C-C of the jaw shown in FIG. 11, according to the second embodiment, with a hole for the external attachment thereof.
Figure 11:
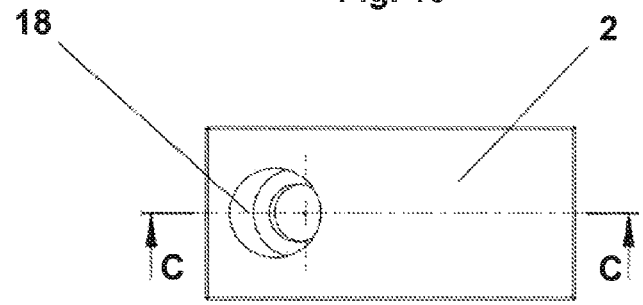
FIG. 11 is a top view of the jaw according to the second embodiment, with a hole for the external attachment thereof.
Figures 12, 14:
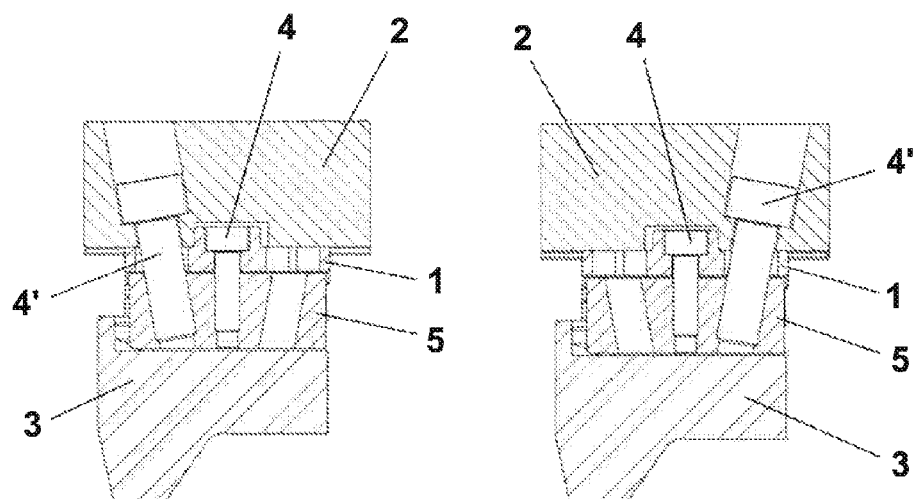
FIG. 12 is a cut view along line D-D of the second embodiment of the device shown in FIG. 13, with a hole for the external attachment thereof.
FIG. 14 is a cut view along line E-E of the second embodiment of the device shown in FIG. 15, with a hole for the internal attachment thereof.
Figures 13, 15:
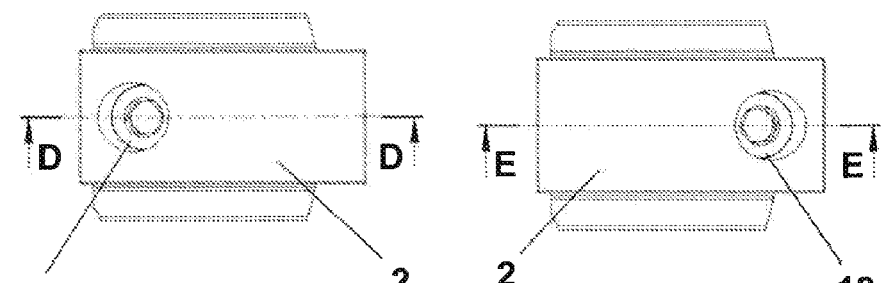
FIG. 13 is a top view of the device for the fast exchange of jaws, according to the second embodiment, with a hole for the external attachment thereof.
FIG. 15 is a top view of the device for the fast exchange of jaws, according to the second embodiment, with a hole for the internal attachment thereof.

According to FIGS. 9 and 10, the inclination distributes the compressive force on the screw in the horizontal and vertical directions, thus creating a vector force that makes it possible to ideally rest the face (31) or (32) of the intermediate support (1) on the face (31') or (32') of the undercut (36) of the jaw (2), respectively, thus fixing the part in the internal or external diameter.

The device for the fast exchange of jaws in a lathe plate provides the following advantages:
fast and precise replacement of different types of jaws;
repeatability in the positioning of jaws;
reduction in the downtime of the machine-tool;
repeatability in the precision of the part; e
reduction of specialized manpower in the "setup" of the machine.

The scope of the present invention, therefore, does not have to be limited to both the illustrations shown herein and the shape of the jaw, but only to the terms defined in the claims and its equivalents.

The invention claimed is:

1. A device for the fast exchange of jaws in a plate of lathe, comprising:
   (A) a jaw holder (3) having a longitudinal central channel (6) on an upper side;
   (B) a T retainer (5) having a straight grooved hole (51) and a slanted grooved hole (51'); the retainer constructed and arranged to be slidebly placed in the longitudinal central channel (6);
   (C) a jaw support (1) having lateral guides (14) on an upper surface; having a protuberance (13) on one end, the protuberance including a internal support face (16); the jaw support having a straight hole (12) axially aligned with the straight grooved hole (51) of the T retainer (5), and a slanted hole (12') axially aligned with the slanted grooved hole (51') of the T retainer (5); and having a longitudinal central channel (11) in a lower surface; the jaw support constructed and arranged to be slidebly placed on an upper surface of the T retainer (5);
   (D) a first screw (4) inserted into the straight grooved hole (51) of the T retainer (5) and the straight hole (12) of the jaw support (1) attaching the jaw support (1) and the T retainer (5) to the jaw holder (3);
   (E) a jaw (2) having a longitudinal central channel (15) on a lower surface the lower surface provided with an oblong center slit (17) internally provided with a slanted through-hole (18), and a radial housing (19) constructed and arranged to house a head of the first screw (4); the jaw constructed and arranged to be slidebly placed on an upper surface of the jaw support (1); the lower surface having an undercut (25) constructed and arranged to fit onto the internal support face (16) of the protuberance (13), and
   (F) a slanted screw (4') inserted into the slanted through-hole (18) of the jaw (2) and into the slanted hole (12') of the jaw support (1), and into the slanted grooved hole (51') of the T retainer (5), attaching the jaw (2) and the jaw support (1) and the T retainer (5) to the jaw holder (3),
   wherein the slanted hole (51') of the T retainer (5), the slanted hole (12') of the jaw support (1) and the slanted through-hole (18) of the jaw (2) are slanted in such a way that the slanted screw (4') is inserted at a same inclination and thus allowing to precisely position the undercut (25) of the jaw (2) onto the internal support face (16) of the protuberance (13), and
   wherein, when exchanging the jaw, the slanted screw (4') is released and the jaw (2) in replaced.

2. The device according to claim 1, wherein the internal support face (16) is curved.

3. The device according to claim 1, wherein the inclination of the slanted through-hole (18) of the jaw (2), the inclination of the slanted hole (12') of the jaw support (1), the inclination of the slanted grooved holes (51') and of the T retainer (5), and the inclination of the screw (4') is between 1 and 89 degrees.

4. The device according to claim 1, wherein the inclination of the slanted through-hole (18) of the jaw (2), the inclination of the slanted hole (12') of the jaw support (1), the inclination of the slanted grooved holes (51') and of the T retainer (5), and the inclination of the screw (4') is between 1 and 20 degrees.

5. The device according to claim 1, wherein the jaw (2) is provided, in an upper surface, with a curved shoulder (20) that mates with a diameter of a part to be machined; and provided with a second slanted through-hole.

6. The device according to claim 1, wherein:
   the jaw support (1) is replace by a jaw (1) support having a protuberance (30) that is provided with a straight hole (33) axially aligned with the straight grooved hole (51) of the T retainer (5), the protuberance forming an internal straight support wall (31), and an external straight support wall (32), and slanted hole (34) axially aligned with the slanted grooved hole (51') of the T retainer (5); and having a longitudinal central channel (11) in a lower surface; the jaw support constructed and arranged to be slidebly placed on an upper surface of the T retainer (5), and
   wherein the first screw (4) inserted into the straight grooved hole (51) of the T retainer (5) and the straight hole (33) of the jaw support (1) attaching the jaw support (1) and the T retainer (5) to the jaw holder (3), and
   wherein the jaw (2) is replaced by a jaw having a longitudinal central channel (15) on a lower surface the lower surface provided with a center slit (36) having internal straight support walls (31' and 32') constructed and arranged to house a head of the first screw (4); and provided with a slanted through-hole (18), and
   wherein the slanted screw (4') inserted into the slanted through-hole (18) of the jaw (2) and into the slanted hole (34) of the jaw support (1), and into the slanted grooved hole (51') of the T retainer (5), attaching the jaw (2) and the jaw support (1) and the T retainer (5) to the jaw holder (3), and
   wherein the slanted hole (51') of the T retainer (5), the slanted hole (34) of the jaw support (1) and the slanted through-hole (18) of the jaw (2) are slanted in such a way that the slanted screw (4') is inserted at a same inclination and thus allowing to precisely position the center slit (36) of the jaw (2) onto the an internal straight support wall (31), and an external straight support wall (32) of the protuberance (30) of the jaw support (1), and
   wherein, when exchanging the jaw, the slanted screw (4') is released and the jaw (2) in replaced.

7. The device according to claim 6, wherein the protuberance (30) is centered or off-centered.

8. The device according to claim 1, wherein:
   the jaw support (1) is replace by a jaw support having a curved protuberance (40) that is provided with a straight hole (33) axially aligned with the straight grooved hole (51) of the T retainer (5), the protuberance forming an internal curved support wall (41), and an external straight support wall (42), and slanted hole (34) axially aligned with the slanted grooved hole (51') of the T retainer (5); and having a longitudinal central channel (11) in a lower surface; the jaw support constructed and arranged to be slidebly placed on an upper surface of the T retainer (5), and
   wherein the first screw (4) inserted into the straight grooved hole (51) of the T retainer (5) and the straight hole (33) of the jaw support (1) attaching the jaw support (1) and the T retainer (5) to the jaw holder (3), and
   wherein the jaw (2) is replace by a jaw (2) having a longitudinal central channel (15) on a lower surface the lower surface provided with a curved center slit (46) having internal straight support walls (41' and 42') constructed and arranged to house a head of the first screw (4); and provided with a slanted through-hole (18), and
   wherein the slanted screw (4') inserted into the slanted through-hole (18) of the jaw (2) and into the slanted hole (34) of the jaw support (1), and into the slanted grooved hole (51') of the T retainer (5), attaching the jaw (2) and the jaw support (1) and the T retainer (5) to the jaw holder (3), and
   wherein the slanted hole (51') of the T retainer (5), the slanted hole (34) of the jaw support (1) and the slanted through-hole (18) of the jaw (2) are slanted in such a way that the slanted screw (4') is inserted at a same inclination and thus allowing to precisely position the center slit (46) of the jaw (2) onto the internal curved support wall (31), and the external curved support wall (32) of the protuberance (40), and wherein, when exchanging the jaw, the slanted screw (4') is released and the jaw (2) in replaced.

9. The device according to claim 1, wherein:

the jaw support (1) is replaced by a jaw support having a center slit (46') having internal support walls and is provided with a straight hole (33) axially aligned with the straight grooved hole (51) of the T retainer (5), and slanted hole (34) axially aligned with the slanted grooved hole (51') of the T retainer (5); and having a longitudinal central channel (11) in a lower surface; the jaw support constructed and arranged to be slidebly placed on an upper surface of the T retainer (5), and wherein the first screw (4) inserted into the straight grooved hole (51) of the T retainer (5) and the straight hole (33) of the jaw support (1) attaching the jaw support (1) and the T retainer (5) to the jaw holder (3), and wherein the jaw (2) is replace by a jaw (2) having a longitudinal central channel (15) on a lower surface the lower surface provided with a protuberance (30'), the protuberance forming an internal support wall and an external support wall constructed and arranged to house a head of the first screw (4); and provided with a slanted through-hole (18), and wherein the slanted screw (4') inserted into the slanted through-hole (18) of the jaw (2) and into the slanted hole (34) of the jaw support (1), and into the slanted grooved hole (51') of the T retainer (5), attaching the jaw (2) and the jaw support (1) and the T retainer (5) to the jaw holder (3), and wherein the slanted hole (51') of the T retainer (5), the slanted hole (34) of the jaw support (1) and the slanted through-hole (18) of the jaw (2) are slanted in such a way that the slanted screw (4') is inserted at a same inclination and thus allowing to precisely position the protuberance (30') of the jaw (2) onto the internal support wall, and the external support wall of the center slit (46') of the jaw support, and wherein, when exchanging the jaw, the slanted screw (4') is released and the jaw (2) in replaced.

10. The device according to claim 1, wherein the slanted hole (18) of the jaw and the grooved holes (51') of the T retainer are replaced by a hole (18) of the jaw, and by grooved holes (51') of the T retainer so that forming a right angle, between the hole (18) of the jaw and the grooved holes (51') of the T retainer, and wherein the jaw (2) is replace by a jaw (2) having a longitudinal central channel (15) on a lower surface the lower surface provided with an undercut (55), and wherein the jaw support (1) is provided with a spring-loaded screw (50) that shall push the undercut (55) provided in the jaw against the face of the protuberance of the intermediate support (1), and wherein, when exchanging the jaw, the slanted screw (4') is released and the jaw (2) in replaced.

11. The device according to claim 1, wherein the jaw support (1) is replace by a jaw (1) having a flat upper surface having a protuberance (13) on one end, the protuberance including a internal support face (16), and provided with a screw (21) on the upper surface, the screw limiting a radial movement of the jaw (2), through a slit (22), positioning the screw so that it rests on the internal support face (16) of the protuberance (13), and thus the hole (18) and the grooved hole (51') shall be straight in such a way that they can receive the screw (4') without any inclination, wherein, when exchanging the jaw, the slanted screw (4') is released and the jaw (2) in replaced.

12. The device according to claim 6, wherein the jaw holder (3) and the jaw support (1) are machined for forming a single body (100).

* * * * *